(12) United States Patent
Rooda et al.

(10) Patent No.: US 11,113,319 B1
(45) Date of Patent: Sep. 7, 2021

(54) HIERARCHICAL DATABASE MONITORING

(71) Applicant: UnitedHealth Group Incorporated, Minnetonka, MN (US)

(72) Inventors: Nick Rooda, Chaska, MN (US); Matthew Rudd, Eden Prairie, MN (US); Edward Krenz, Lino Lakes, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 112 days.

(21) Appl. No.: 16/692,344

(22) Filed: Nov. 22, 2019

Related U.S. Application Data

(60) Provisional application No. 62/772,290, filed on Nov. 28, 2018.

(51) Int. Cl.
*G06F 16/28* (2019.01)
*G06F 11/34* (2006.01)

(52) U.S. Cl.
CPC ........ *G06F 16/288* (2019.01); *G06F 11/3409* (2013.01); *G06F 16/282* (2019.01); *G06F 16/289* (2019.01)

(58) Field of Classification Search
CPC .............................. G06F 16/288; G06F 16/282
USPC ......................................................... 707/741
See application file for complete search history.

(56) References Cited

U.S. PATENT DOCUMENTS

| | | | | |
|---|---|---|---|---|
| 5,630,072 A * | 5/1997 | Dobbins | ............. | G06Q 20/203 705/22 |
| 8,055,622 B1 | 11/2011 | Botes et al. | | |
| 2006/0059238 A1* | 3/2006 | Slater | ..................... | H04L 51/12 709/206 |
| 2014/0201126 A1* | 7/2014 | Zadeh | .................... | A61B 5/165 706/52 |
| 2018/0204111 A1* | 7/2018 | Zadeh | ................. | G06K 9/3233 |
| 2019/0370360 A1* | 12/2019 | Mainali | ................ | G06F 3/0658 |
| 2019/0370362 A1* | 12/2019 | Mainali | ................... | G06F 16/13 |
| 2019/0370365 A1* | 12/2019 | Chalakov | ............. | G06F 16/182 |

FOREIGN PATENT DOCUMENTS

| | | |
|---|---|---|
| JP | 2003-030397 A | 1/2003 |
| WO | 2007/038666 A2 | 4/2007 |

OTHER PUBLICATIONS

De Castro, Cristina et al. "Schema Versioning for Multitemporal Relational Databases," Information Systems, vol. 22, No. 5, pp. 249-290, (1997).

(Continued)

*Primary Examiner* — Eliyah S. Harper
(74) *Attorney, Agent, or Firm* — Alston & Bird LLP

(57) ABSTRACT

There is a need for more effective and efficient hierarchical database monitoring. This need can be addressed by, for example, solutions for performing/executing hierarchical database monitoring in an effective and efficient manner. In one example, a method includes identifying related hierarchical entities for each hierarchical entity; identifying an entity tracking data object for each hierarchical entity; updating the entity tracking data objects; generating a database monitoring data object based at least in part on the updated entity tracking data objects; and performing monitoring of the hierarchical database based at least in part on the database monitoring data object.

20 Claims, 9 Drawing Sheets

(56) References Cited

OTHER PUBLICATIONS

Etzion, Opher et al. "Retroactive and Proactive Database Processing," Proceedings of the IEEE International Workshop On Research Issues In Data Engineering: Active Databases Systems, pp. 126-131, Feb. 14-15, 1994).

* cited by examiner

```
<customerPurchaseDetail customerPurchaseIdentifier="60501" customerPurchaseEffectiveDate="2017-01-01"
    customerPurchaseTerminationDate="2017-12-31" customerPurchaseSitusStateCode="CT"
601 coverageMonthStartDate="2017-01-01" coverageMonthEndDate="2017-01-31"
    generalLedgerDiffDate="2017-01-01" ratingFipsCountyCode="09003" ratingPostalCode="06103"
    packageOptionPlanIdentifier="FU" metallicLevelCode="FU" customerAccountIdentifier="120502"
    businessSegmentIdentifier="3" legalEntityIdentifier="3" contLegalEntityIdentifier=""
    customerAccountEffectiveStartDate="2017-01-01" customerAccountTerminationDate="9999-12-31"
    salesOfficeCode="339" exchangeTypeCode="1" organizationIdentifier="1158477"
    organizationTypeCode="1" voluntaryAssociationIdentifier="1158477"
    reportingYearValue="2017" employeeCount="50" employeeCountMethodCode="01"
    serviceAreaCode="New_England">
  <customerPurchaseItem productIdentifier="PM0000006" productTypeCode="01"
      itemIdentifier="M000000142" planTypeCode="06" planHealthCoverageType="BENTYPE_MEDICAL"
602   fundingArrangementCode="01" packageOptionPlanTypeCode="0" generalLedgerBusinessUnitIdentifier="58545"
      generalLedgerBusinessUnitOwnIdentifier="58545" generalLedgerOperatingUnitIdentifier="02001"
      generalLedgerProductIdentifier="102040" generalLedgerLocationIdentifier="USACT800"
      generalLedgerCustomerIdentifier="0000020" generalLedgerCustomerATNIdentifier="0200003"
      generalLedgerAccountIdentifier="MF001" generalLedgerReinsuranceIdentifier="FU"
      generalLedgerProjectIdentifier="FU" generalLedgerDepartmentIdentifier="FU"
      marketSegmentCode="ML">
    <membership subscriberIndividualIdentifier="310000490005" subscriberExternalIdentifier="63097216400"
        enrolleeIndividualIdentifier="310000490005" enrolleeExternalIdentifier="63097216400"
        membershipEffectiveDate="2017-01-01" coverageLevelCode="EMP" eligibilityRelationshipCode="18"
        membershipTerminationDate="9999-12-31" medicareEntitlementTypeCode=""
        payerResponsibilitySequenceCode="" subscriberResidentStateCode="CT"
        itemStatCd="A">
      <subscriberCount>1</subscriberCount>            603
604   <memberCount>1</memberCount>
      <survivingSpouseCount>0</survivingSpouseCount>   605
    </membership>
  </customerPurchaseItem>
</customerPurchaseDetail>
```

FIG. 6

HIERARCHICAL DATABASE MONITORING

CROSS-REFERENCE TO RELATED APPLICATIONS

The present application claims the benefit of U.S. Provisional Patent Application No. 62/772,290, filed Nov. 28, 2018, which is incorporated herein in its entirety.

BACKGROUND

Various embodiments of the present invention address technical challenges related to performing hierarchical database monitoring. Because of the complexity of the data models utilized by hierarchical databases, monitoring such hierarchical databases presents unique reliability and efficiency challenges. Various embodiments of the present address the shortcomings of existing hierarchical database monitoring systems and disclose various techniques for efficiently and reliably performing hierarchical database monitoring.

BRIEF SUMMARY

In general, embodiments of the present invention provide methods, apparatus, systems, computing devices, computing entities, and/or the like for performing/executing hierarchical database monitoring. Certain embodiments utilize systems, methods, and computer program products that perform/execute hierarchical database monitoring using one or more of entity tracking data objects, entity invalidation statuses, invalidation iteration identifiers, creation iteration identifier, replicating invalidations, and non-replicating invalidations.

In accordance with one aspect, a method is provided. In one embodiment, the method comprises: for each hierarchical entity of the plurality of hierarchical entities, identifying one or more related hierarchical entities of the plurality of hierarchical entities, wherein the one or more related hierarchical entities comprise the corresponding hierarchical entity and any hierarchical entities of the plurality of hierarchical entities that depend from the corresponding hierarchical entity; for each hierarchical entity of the plurality of hierarchical entities, identifying an entity tracking data object of a plurality of entity tracking data objects, wherein the entity tracking data object comprises an entity invalidation status for the corresponding hierarchical entity; for each hierarchical entity of the plurality of hierarchical entities whose entity invalidation status indicates a valid entity status, updating the plurality of entity tracking data objects by: (a) determining, based at least in part on the entity-related data, an entity invalidation condition associated with the corresponding hierarchical entity, (b) determining whether the entity invalidation condition associated with the corresponding hierarchical entity indicates an invalid entity condition or a modified entity condition, (c) responsive to determining that the entity invalidation condition associated with the corresponding hierarchical entity indicates the invalid entity condition, performing a non-replicating invalidation of the corresponding hierarchical entity, wherein performing the non-replicating invalidation of the corresponding hierarchical entity comprises updating each entity tracking data object for a related hierarchical entity of the one or more related hierarchical entities associated with the corresponding hierarchical entity to invalidate the related hierarchical entity, and (d) responsive to determining that the entity invalidation condition associated with the corresponding hierarchical entity indicates the modified entity condition, performing a replicating invalidation of the corresponding hierarchical entity, wherein performing the replicating invalidation of the corresponding hierarchical entity comprises updating each entity tracking data object for a related hierarchical entity of the one or more related hierarchical entities associated with the corresponding hierarchical entity to invalidate the related hierarchical entity, generating a modified entity tracking data object for the corresponding hierarchical entity, and generating a replicated tracking data object for each related hierarchical entity of the one or more related hierarchical entities associated with the corresponding hierarchical entity other than the corresponding hierarchical entity; and subsequent to updating the plurality of entity tracking data objects: (a) generating the database monitoring data object based at least in part on the plurality of entity tracking data objects, and (b) performing monitoring of the hierarchical database based at least in part on the database monitoring data object.

In accordance with another aspect, a computer program product is provided. The computer program product may comprise at least one computer-readable storage medium having computer-readable program code portions stored therein, the computer-readable program code portions comprising executable portions configured to: for each hierarchical entity of the plurality of hierarchical entities, identify one or more related hierarchical entities of the plurality of hierarchical entities, wherein the one or more related hierarchical entities comprise the corresponding hierarchical entity and any hierarchical entities of the plurality of hierarchical entities that depend from the corresponding hierarchical entity; for each hierarchical entity of the plurality of hierarchical entities, identify an entity tracking data object of a plurality of entity tracking data objects, wherein the entity tracking data object comprises an entity invalidation status for the corresponding hierarchical entity; for each hierarchical entity of the plurality of hierarchical entities whose entity invalidation status indicates a valid entity status, update the plurality of entity tracking data objects by: (a) determining, based at least in part on the entity-related data, an entity invalidation condition associated with the corresponding hierarchical entity, (b) determining whether the entity invalidation condition associated with the corresponding hierarchical entity indicates an invalid entity condition or a modified entity condition, (c) responsive to determining that the entity invalidation condition associated with the corresponding hierarchical entity indicates the invalid entity condition, performing a non-replicating invalidation of the corresponding hierarchical entity, wherein performing the non-replicating invalidation of the corresponding hierarchical entity comprises updating each entity tracking data object for a related hierarchical entity of the one or more related hierarchical entities associated with the corresponding hierarchical entity to invalidate the related hierarchical entity, and (d) responsive to determining that the entity invalidation condition associated with the corresponding hierarchical entity indicates the modified entity condition, performing a replicating invalidation of the corresponding hierarchical entity, wherein performing the replicating invalidation of the corresponding hierarchical entity comprises updating each entity tracking data object for a related hierarchical entity of the one or more related hierarchical entities associated with the corresponding hierarchical entity to invalidate the related hierarchical entity, generating a modified entity tracking data object for the corresponding hierarchical entity, and generating a replicated tracking data object for each related hierarchical entity of the one or more related hierarchical entities associated with the corresponding hierarchical entity other than the corresponding hierarchical entity; and subsequent to updating the plurality of entity tracking data objects: (a) generate the database monitoring data object based at least in part on the plurality of entity tracking data objects, and (b) perform monitoring of the hierarchical database based at least in part on the database monitoring data object.

In accordance with yet another aspect, an apparatus comprising at least one processor and at least one memory including computer program code is provided. In one embodiment, the at least one memory and the computer program code may be configured to, with the processor, cause the apparatus to: for each hierarchical entity of the plurality of hierarchical entities, identify one or more related hierarchical entities of the plurality of hierarchical entities, wherein the one or more related hierarchical entities comprise the corresponding hierarchical entity and any hierarchical entities of the plurality of hierarchical entities that depend from the corresponding hierarchical entity; for each hierarchical entity of the plurality of hierarchical entities, identify an entity tracking data object of a plurality of entity tracking data objects, wherein the entity tracking data object comprises an entity invalidation status for the corresponding hierarchical entity; for each hierarchical entity of the plurality of hierarchical entities whose entity invalidation status indicates a valid entity status, update the plurality of entity tracking data objects by: (a) determining, based at least in part on the entity-related data, an entity invalidation condition associated with the corresponding hierarchical entity, (b) determining whether the entity invalidation condition associated with the corresponding hierarchical entity indicates an invalid entity condition or a modified entity condition, (c) responsive to determining that the entity invalidation condition associated with the corresponding hierarchical entity indicates the invalid entity condition, performing a non-replicating invalidation of the corresponding hierarchical entity, wherein performing the non-replicating invalidation of the corresponding hierarchical entity comprises updating each entity tracking data object for a related hierarchical entity of the one or more related hierarchical entities associated with the corresponding hierarchical entity to invalidate the related hierarchical entity, and (d) responsive to determining that the entity invalidation condition associated with the corresponding hierarchical entity indicates the modified entity condition, performing a replicating invalidation of the corresponding hierarchical entity, wherein performing the replicating invalidation of the corresponding hierarchical entity comprises updating each entity tracking data object for a related hierarchical entity of the one or more related hierarchical entities associated with the corresponding hierarchical entity to invalidate the related hierarchical entity, generating a modified entity tracking data object for the corresponding hierarchical entity, and generating a replicated tracking data object for each related hierarchical entity of the one or more related hierarchical entities associated with the corresponding hierarchical entity other than the corresponding hierarchical entity; and subsequent to updating the plurality of entity tracking data objects: (a) generate the database monitoring data object based at least in part on the plurality of entity tracking data objects, and (b) perform monitoring of the hierarchical database based at least in part on the database monitoring data object.

BRIEF DESCRIPTION OF THE DRAWINGS

Figure 1:
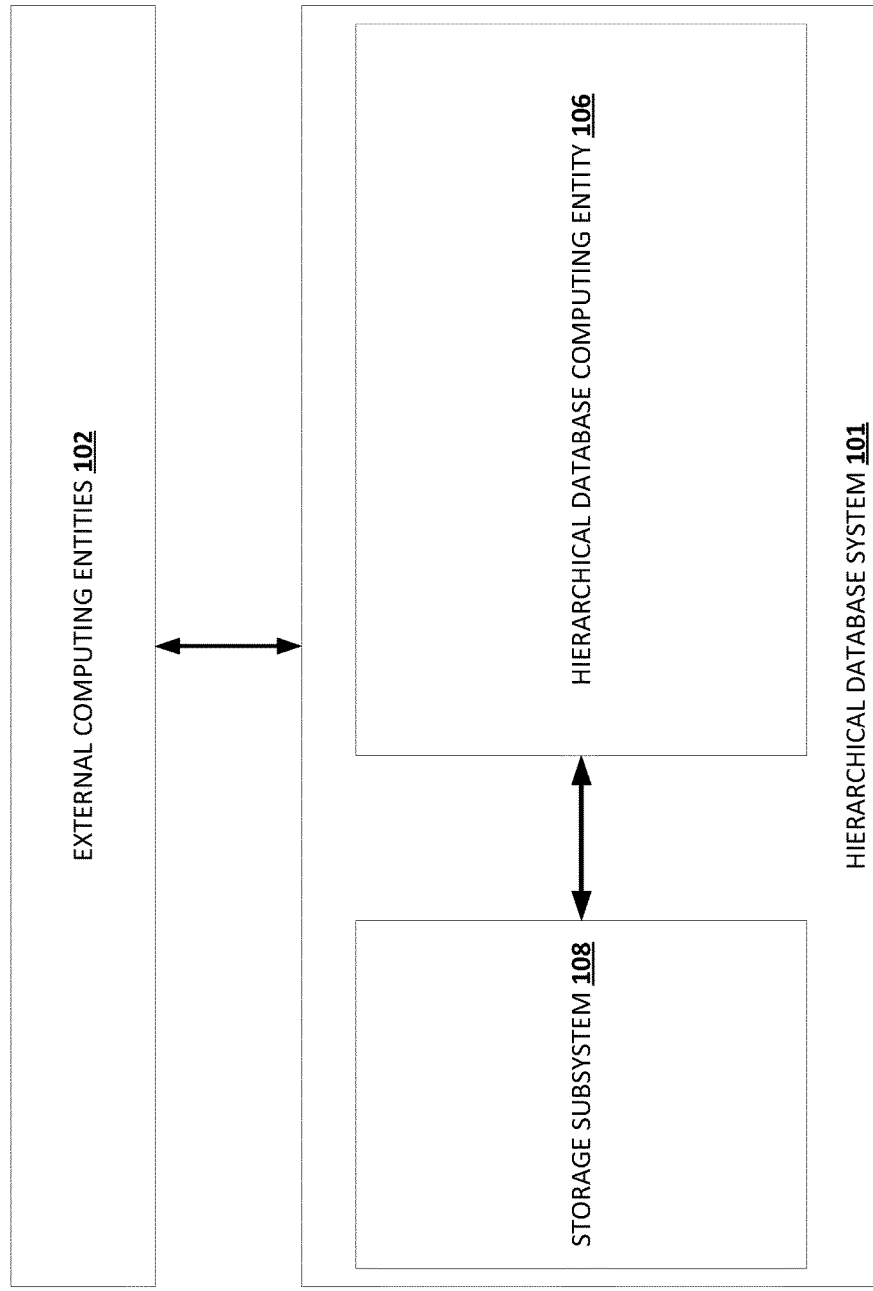

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
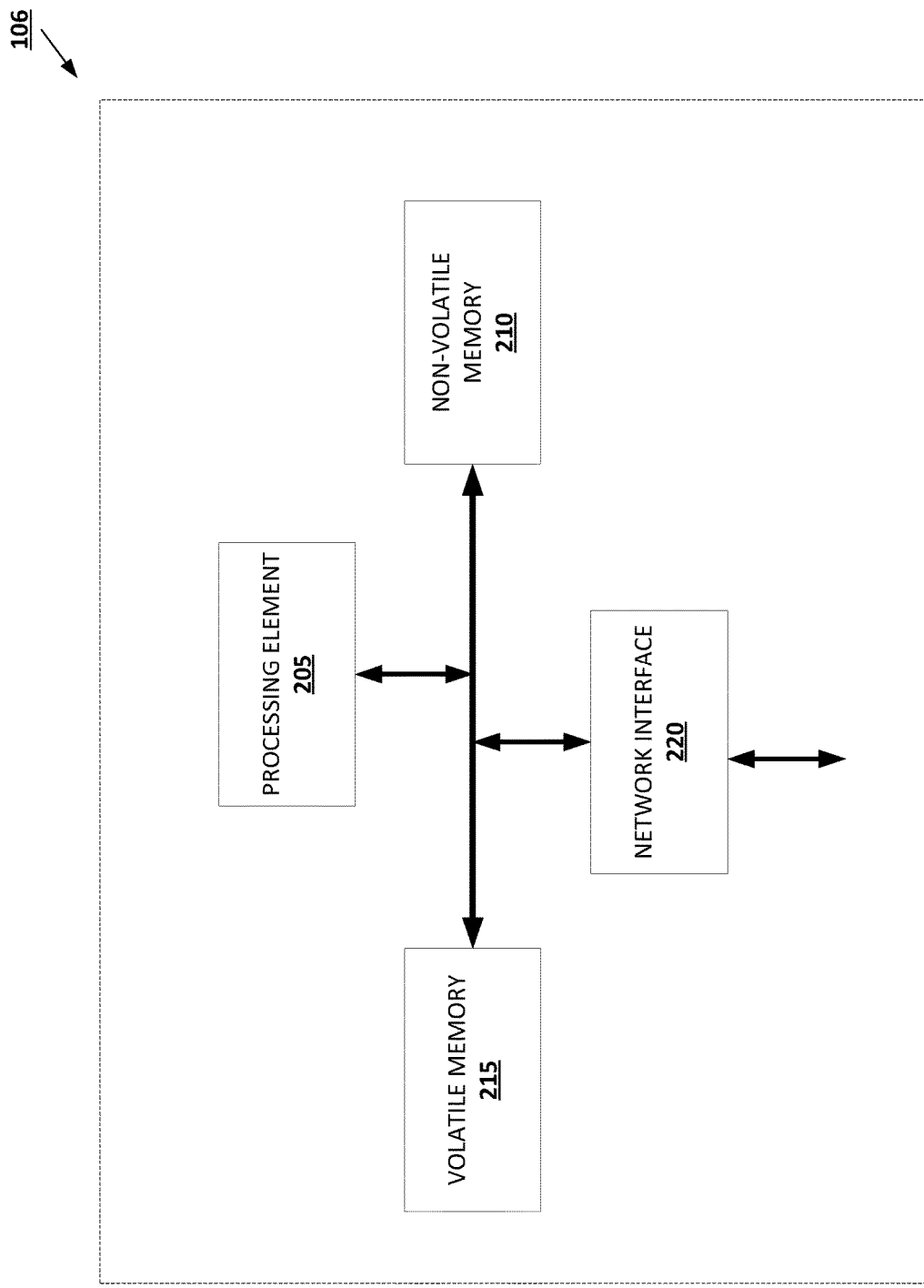

FIG. 2 provides an example hierarchical database computing entity in accordance with some embodiments discussed herein.

Figure 3:
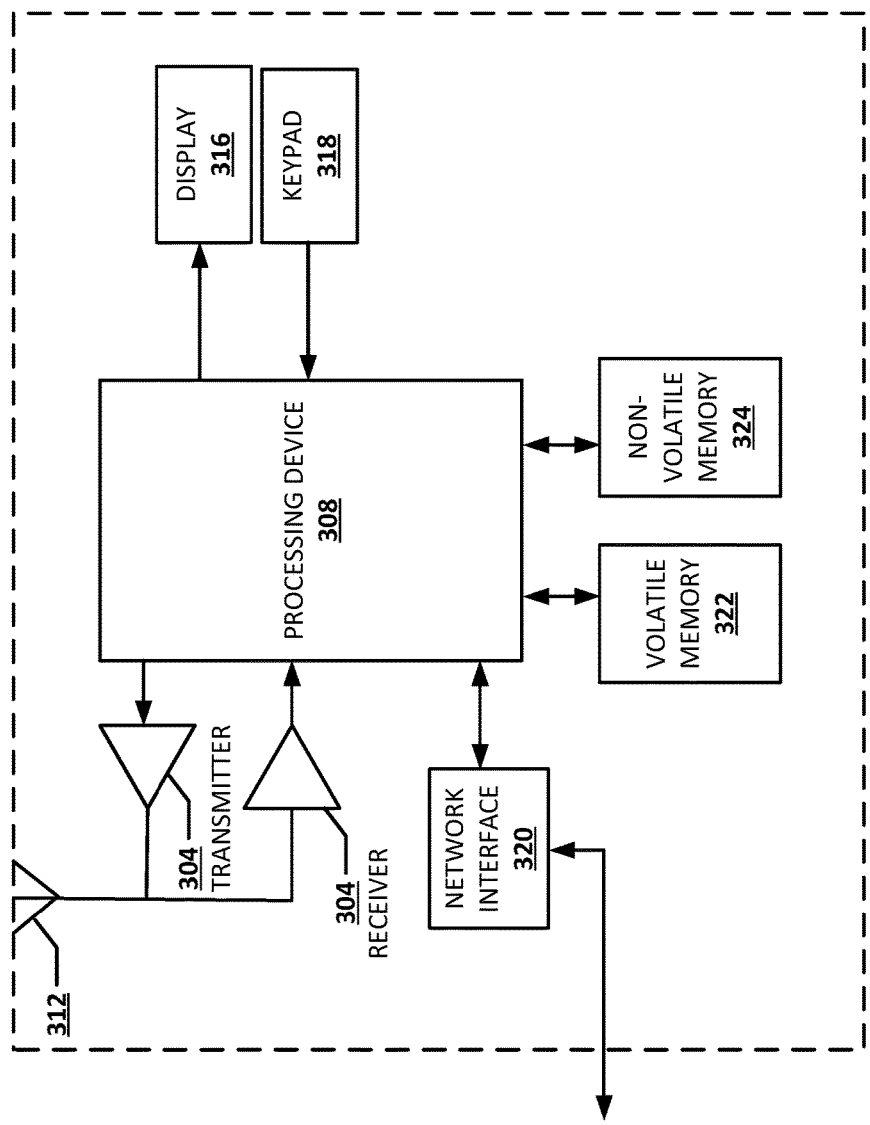

FIG. 3 provides an example external computing entity in accordance with some embodiments discussed herein.

Figure 4:
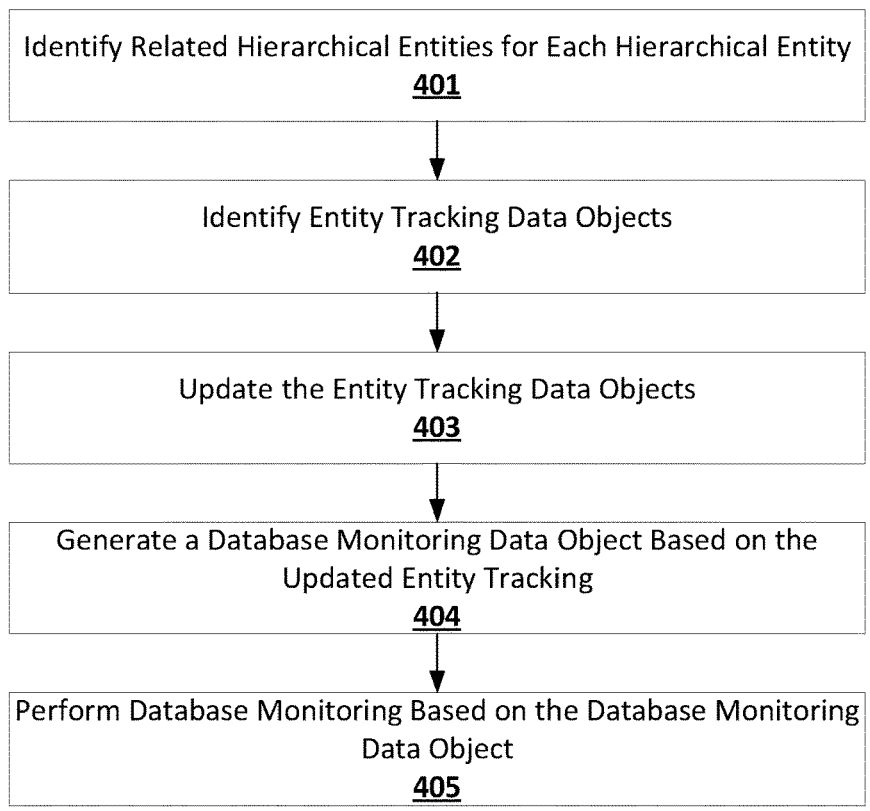

FIG. 4 is a flowchart diagram of an example process for performing database monitoring with respect to a hierarchical database in accordance with some embodiments discussed herein.

Figure 5:
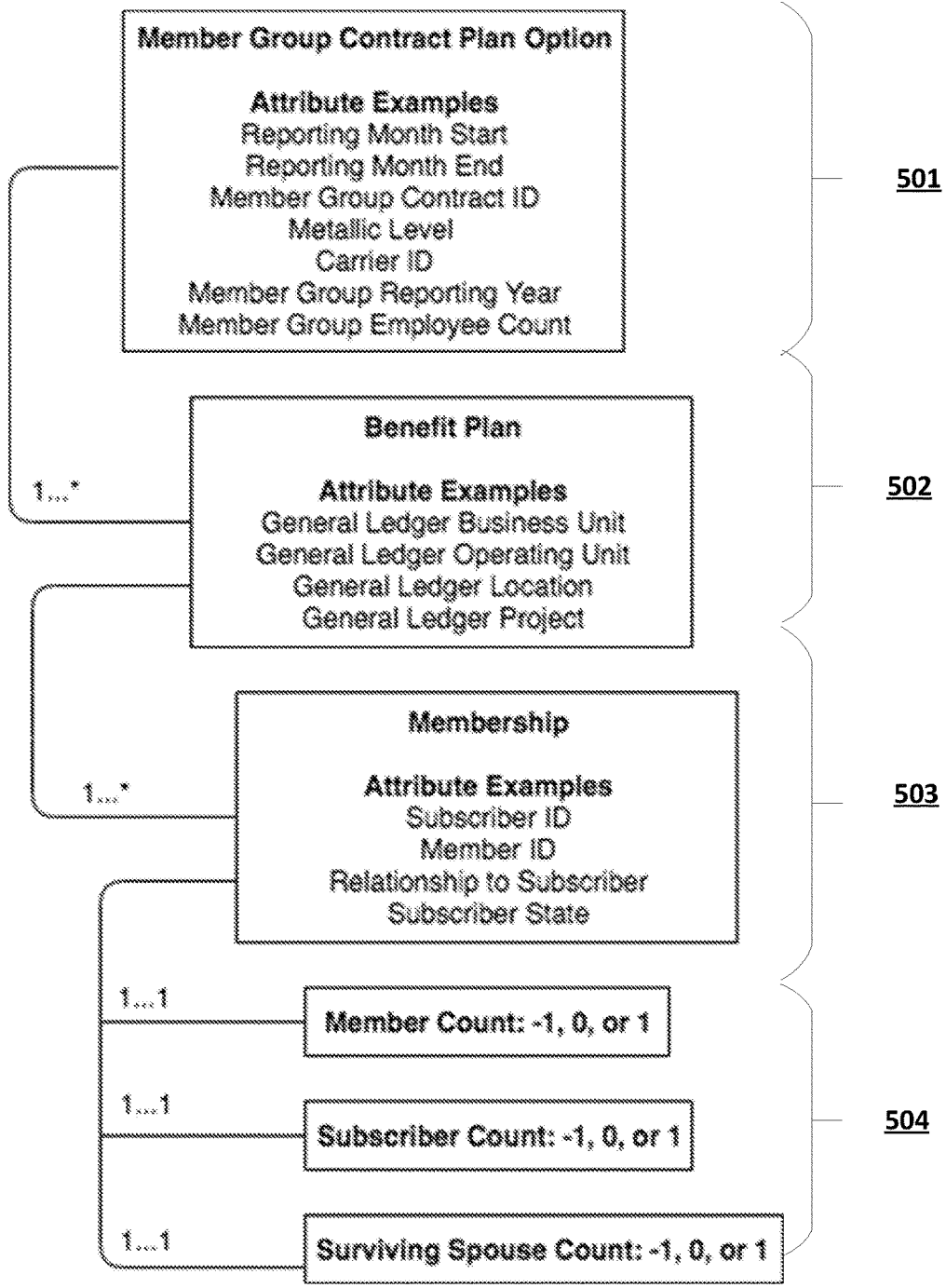

FIG. 5 is an operational example of a hierarchical database data model in accordance with some embodiments discussed herein.

FIG. 6 is an operational example of an entity tracking data object file in accordance with some embodiments discussed herein.

Figure 7:
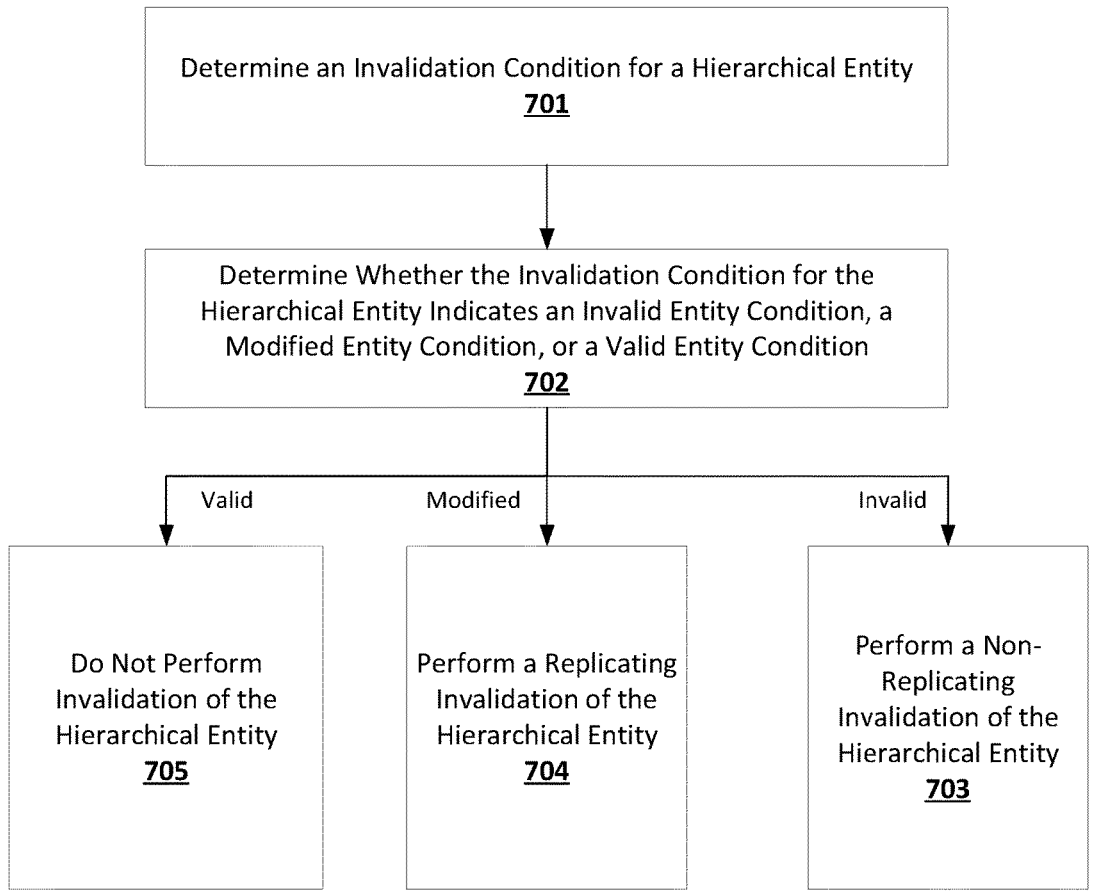

FIG. 7 is a flowchart diagram of an example process for analyzing a hierarchical entity to update entity tracking data objects associated with a hierarchical database in accordance with some embodiments discussed herein.

Figure 8:
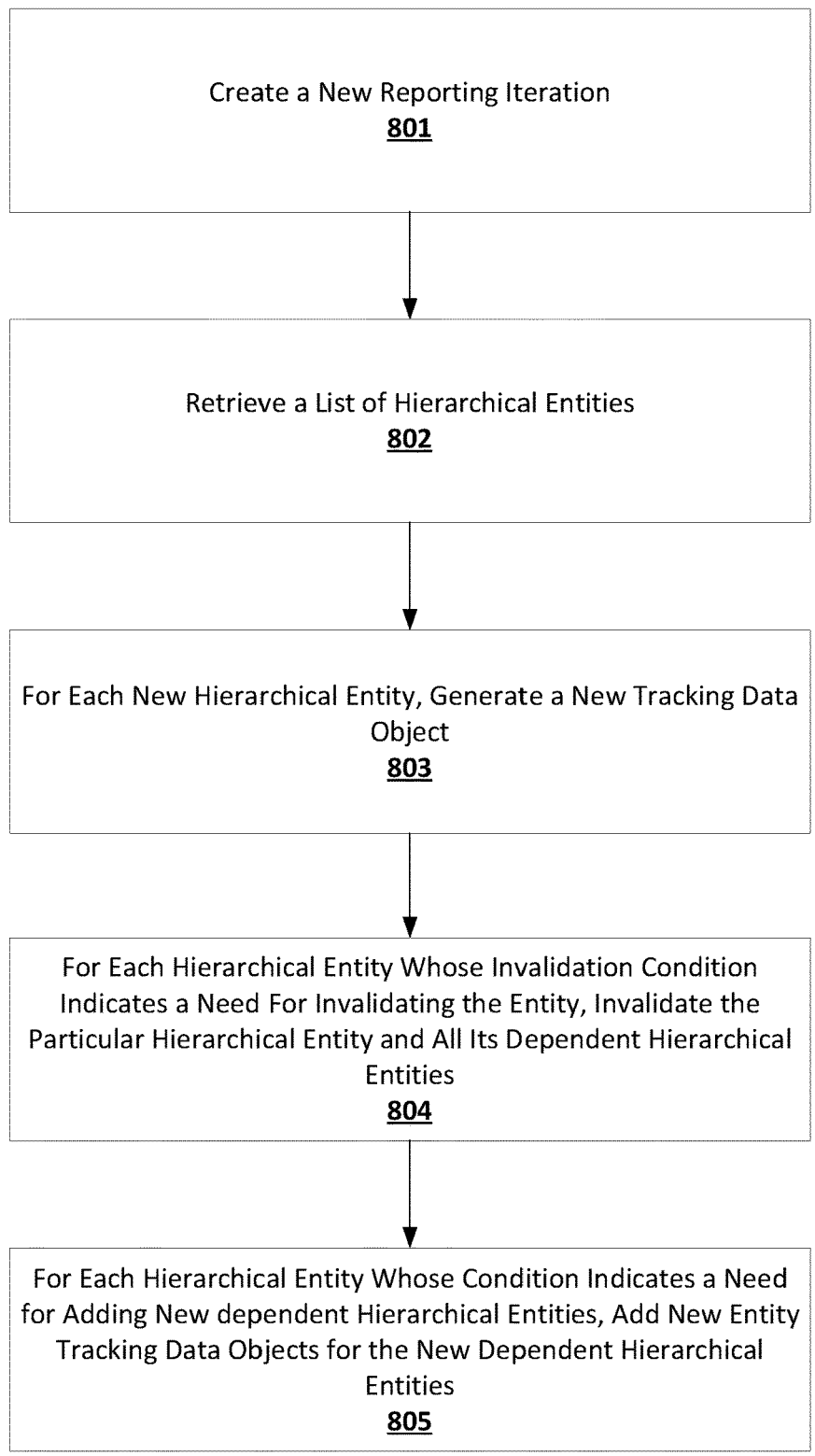

FIG. 8 is a flowchart diagram of an example process for generating an entity tracking report for a hierarchical database during a current monitoring iteration in accordance with some embodiments discussed herein.

Figure 9:
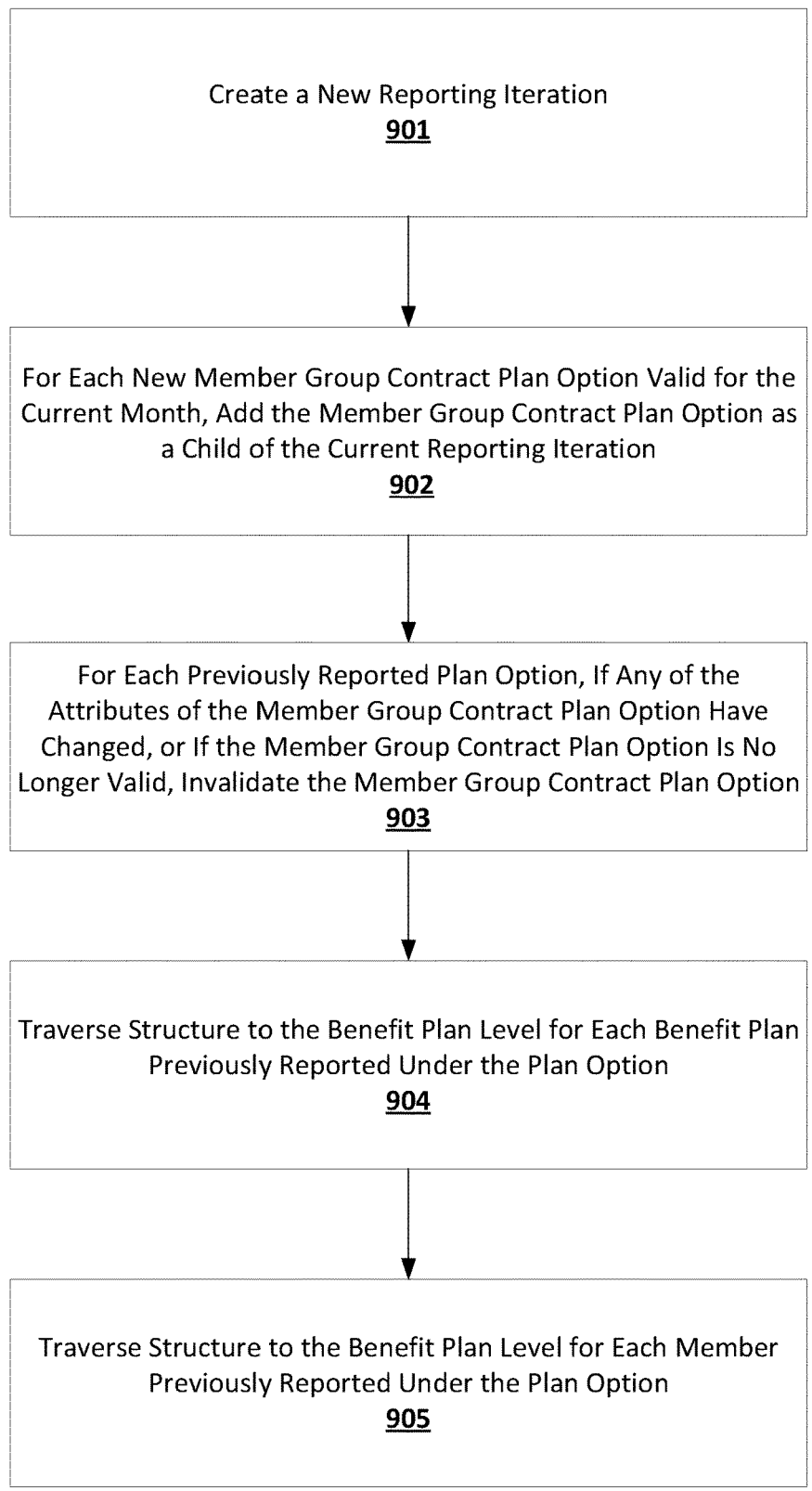

FIG. 9 is a flowchart diagram of an example process for generating a membership accounting report for a membership information database in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address technical challenges related to monitoring hierarchical databases. In a hierarchical database, data entities are related to each other with hierarchical relationships, often very complex and multi-layered hierarchical relationships. Because of their complex semantic structure, hierarchical databases present unique problems for efficient and effective database monitoring. For example, in a hierarchical database, any invalidation or modification of a particular hierarchical entity may have effects on some but not all of the hierarchical entities that have defined hierarchical relationships with the corresponding hierarchical entity. As a result, many existing hierarchical database monitoring solutions will resort to one of two approaches to address the challenges associated with efficient and effective monitoring of various hierarchical databases: performing multiple monitoring iterations to generate each monitoring report or limiting propagation of invalidation or modification of particular hierarchical entities across their corresponding hierarchical relationships. The former approach is inefficient while the latter approach fails to perform reliable monitoring metrics under various runtime conditions.

Various embodiments of the present invention introduce techniques for performing monitoring of a hierarchical database in a manner that, during a single iteration, can propagate invalidations or modifications across hierarchical relationships characterizing a hierarchical database. For example, in some embodiments, a proposed system determines, based at least in part on entity-related data associated with a hierarchical database, an entity invalidation condition associated with each hierarchical entity. Responsive to determining that the entity invalidation condition associated with a hierarchical entity indicates an invalid entity condition, the proposed system updates each entity tracking data object for a dependent hierarchical entity associated with the corresponding hierarchical entity to invalidate the dependent hierarchical entity. However, responsive to determining that the entity invalidation condition associated with a hierarchical entity a the modified entity condition, the proposed system updates each entity tracking data object for a dependent hierarchical entity associated with the corresponding hierarchical entity to invalidate the related hierarchical entity, generates a modified entity tracking data object for the corresponding hierarchical entity, and generates a replicated tracking data object for each dependent hierarchical entity associated with the corresponding hierarchical entity other than the corresponding hierarchical entity. In this way, the proposed system can ensure effective hierarchical propagation of invalidations and modifications while preventing a monitoring iteration repeat need scenario.

By utilizing the noted techniques and similar techniques described herein, various embodiments of the present invention provide techniques for efficiently and reliably performing database monitoring in a hierarchical database. The noted techniques accommodate the unique needs and complexities of hierarchical databases and make important contributions to reducing time complexity of hierarchical database monitoring routines in highly-complex databases, such as hierarchical databases. Importantly, by reducing time complexity of hierarchical database monitoring, the described techniques allow for retroactive entity tracking in hierarchical databases, a task that requires performing entity tracking across various temporal units during a single monitoring iteration. Accordingly, various embodiments of the present invention address technical challenges related to improving effectiveness and efficiency of hierarchical database monitoring solutions and substantially improve the effectiveness and efficiency of existing hierarchical database monitoring frameworks.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing/executing hierarchical database monitoring. The architecture 100 includes a hierarchical database system 101 configured to store one or more hierarchical databases, receive database monitoring requests for monitoring the hierarchical databases, generate database monitoring data objects for the hierarchical databases in response to the received database monitoring requests, provide the generated database monitoring data objects to particular external computing entities 102 (e.g., monitoring authority computing entities), and/or automatically set configuration parameters for the hierarchical databases. For example, the hierarchical database system 101 may be configured to maintain a member information database for a health insurance provider institution, perform database monitoring of the member information database to generate membership accounting reports for the health insurance provider institution, and provide the membership accounting reports to one or more financial institution computing entities.

In some embodiments, hierarchical database system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The hierarchical database system 101 may include a hierarchical database computing entity 106 and a storage subsystem 108. The hierarchical database computing entity 106 may be configured to receive database monitoring requests for monitoring the hierarchical databases, generate database monitoring data objects for the hierarchical databases in response to the received database monitoring requests, provide the generated database monitoring data objects to particular external computing entities 102 (e.g., monitoring authority computing entities), and/or automatically set configuration parameters for the hierarchical databases.

The storage subsystem 108 may be configured to store data associated with the hierarchical databases maintained by the hierarchical database system 101. The storage subsystem 108 may further be configured to store configuration data associated with the hierarchical database system 101, such as configuration data associated with the hierarchical databases maintained by the hierarchical database system 101 and/or configuration data associated with the operation of the hierarchical database computing entity 106.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RANI, Millipede memory, racetrack memory, and/or the like.

Exemplary Hierarchical Database Computing Entity

FIG. 2 provides a schematic of a hierarchical database computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the hierarchical database computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the hierarchical database computing entity 106 may include or be in communication with one or more processing elements 205 (also referred to as processors, processing circuitry, and/or similar terms used herein interchangeably) that communicate with other elements within the hierarchical database computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the hierarchical database computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the hierarchical database computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the hierarchical database computing entity 106 with the assistance of the processing element 205 and operating system.

As indicated, in one embodiment, the hierarchical database computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the hierarchical database computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the hierarchical database computing entity 106 may include or be in communication with one or more input elements, such as a keyboard input, a mouse input, a touch screen/display input, motion input, movement input, audio input, pointing device input, joystick input, keypad input, and/or the like. The hierarchical database computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the hierarchical database computing entity 106. In a particular embodiment, the external computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the hierarchical database computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the hierarchical database computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the hierarchical database computing entity 106 and/or various other computing entities.

In another embodiment, the external computing entity 102 may include one or more components or functionality that are the same or similar to those of the hierarchical database computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

Various embodiments of the present invention introduce techniques for performing monitoring of a hierarchical database in a manner that, during a single iteration, can propagate invalidations or modifications across hierarchical relationships characterizing a hierarchical database. For example, in some embodiments, a proposed system determines, based at least in part on entity-related data associated with a hierarchical database, an entity invalidation condition associated with each hierarchical entity. Responsive to determining that the entity invalidation condition associated with a hierarchical entity indicates an invalid entity condition, the proposed system updates each entity tracking data object for a dependent hierarchical entity associated with the corresponding hierarchical entity to invalidate the dependent hierarchical entity. However, responsive to determining that the entity invalidation condition associated with a hierarchical entity a the modified entity condition, the proposed system updates each entity tracking data object for a dependent hierarchical entity associated with the corresponding hierarchical entity to invalidate the related hierarchical entity, generates a modified entity tracking data object for the corresponding hierarchical entity, and generates a replicated tracking data object for each dependent hierarchical entity associated with the corresponding hierarchical entity other than the corresponding hierarchical entity. In this way, the proposed system can ensure effective hierarchical propagation of invalidations and modifications while preventing a monitoring iteration repeat need scenario.

By utilizing the noted techniques and similar techniques described herein, various embodiments of the present invention provide techniques for efficiently and reliably performing database monitoring in a hierarchical database. The noted techniques accommodate the unique needs and complexities of hierarchical databases and make important contributions to reducing time complexity of hierarchical database monitoring routines in highly-complex databases, such as hierarchical databases. Importantly, by reducing time complexity of hierarchical database monitoring, the described techniques allow for retroactive entity tracking in hierarchical databases, a task that requires performing entity tracking across various temporal units during a single monitoring iteration. Accordingly, various embodiments of the present invention address technical challenges related to improving effectiveness and efficiency of hierarchical database monitoring solutions and substantially improve the effectiveness and efficiency of existing hierarchical database monitoring frameworks.

A. Hierarchical Database Monitoring

FIG. 4 is a flowchart diagram of an example process 400 for performing database monitoring with respect to a hierarchical database. Via the various steps/operations of process 400, the hierarchical database computing entity 106 can perform effective and efficient adjustments to entity states for various hierarchical entities in a hierarchical database in a manner that reliably addresses hierarchical relationships between the various hierarchical entities in the hierarchical database.

At step/operation 401, the hierarchical database computing entity 106 identifies one or more related hierarchical entities for each hierarchical entity associated with the hierarchical database. The related entities for a particular hierarchical entity may include the corresponding hierarchical entity itself and any hierarchical entities associated with the hierarchical database that depend from the corresponding hierarchical entity. In some embodiments, the hierarchical database is configured to maintain entity-related data associated with a plurality of hierarchical entities, where the plurality of hierarchical entities may be related to each other by a hierarchical structure that defines one or more hierarchical relationships. The hierarchical database computing entity 106 may utilize the noted hierarchical structure to determine the related hierarchical entities for each particular hierarchical entity associated with the hierarchical database. In some embodiments, the hierarchical database is a membership information database, and at least some of plurality of hierarchical entities are associated with one or more member profiles associated with the membership information database.

For example, given a hierarchical database associated with the hierarchical entities HE1-HE6 where hierarchical entities HE2-HE3 directly depend from the hierarchical entity HE1, hierarchical entity HE4 depends from the hierarchical entity HE2, hierarchical entity HE5 depends from the hierarchical entity HE4, and hierarchical entity HE6 depends from the hierarchical entity HE3, the related hierarchical entities for each of the hierarchical entities HE1-HE6 may include: for the hierarchical entity HE1, hierarchical entities HE1-HE6; for the hierarchical entity HE2, hierarchical entities HE2 and HE4-HE5; for the hierarchical entity HE3, hierarchical entities HE3 and HE6; for the hierarchical entity HE4, hierarchical entities HE4-HE5; for the hierarchical entity HE5, the hierarchical entity HE5 itself; and for the hierarchical entity HE6, the hierarchical entity HE6 itself. In some embodiments, a hierarchical entity A is deemed to be related to a hierarchical entity B if changes in at least one aspect of the status of hierarchical entity B may affect the status of the hierarchical entity A. For example, in the described example, an invalidation of the hierarchical entity HE1 may necessitate the invalidation of all of the hierarchical entities HE2-HE5.

An operational example of a hierarchical database data model 500 for a hierarchical database is depicted in FIG. 5. As depicted in FIG. 5, the hierarchical database data model 500 includes four hierarchical levels 501-504, where each hierarchical level 501-504 is associated with one or more hierarchical entity types, and further where each hierarchical entity type is associated with one or more attribute types. For example, the hierarchical level 501 is a highest hierarchical level that is associated with a "Member Group Contract Plan Option" hierarchical entity type. As another example, the hierarchical level 502 is a second-highest hierarchical level that is associated with a "Benefit Plan" hierarchical entity type. As yet another example, the hierarchical level 503 is a third-highest hierarchical level that is associated with a "Membership" hierarchical entity type. As a further example, the hierarchical level 504 is a fourth-highest hierarchical level that is associated with a "Member Count" hierarchical entity type, a "Subscriber Count" hierarchical entity type, and a "Surviving Spouse Count" hierarchical entity type.

In some embodiments, each hierarchical entity of the plurality of hierarchical entities is associated with an entity designation of a plurality of entity designations and a temporal unit designation of a plurality of temporal unit designations (e.g., a month of a predefined number of months, such as 48 months). For example, a first hierarchical entity may be associated with monitoring attributes for a first group plan during a first month and a second hierarchical entity may be associated with monitoring attributes for the first group plan during a second month. Associating hierarchical entities with temporal unit designations may enable retroactive reporting of changes to entity states in prior temporal units even when such changes were not properly captured during monitoring iterations associated with the prior temporal units. For example, given a change in a membership state for a particular member for October that only gets reflected in entity-related data by November, the hierarchical database computing entity 106 can reflect the change in the November monitoring report but for the appropriate entity associated with the particular member and the month of October. In this way, the hierarchical database computing entity 106 can both record that the change has occurred in October but that it has first been reflected in monitoring reports as of the November report. In some embodiments, each temporal unit may be associated with two or more monitoring iterations. For example, two database monitoring data objects may be generated during each month.

At step/operation 402, the hierarchical database computing entity 106 identifies a plurality of entity tracking data objects for the hierarchical entities associated with the hierarchical database. In some embodiments, the hierarchical database computing entity 106 identifies an entity tracking data object for each hierarchical entity associated with the hierarchical database. In some embodiments, the entity tracking data object for a hierarchical entity is a data object that indicates one or more properties of the hierarchical entity, such as an entity invalidation status for the hierarchical entity, an invalidation iteration identifier for the hierarchical entity, a creation iteration identifier for the hierarchical entity, and one or more entity attributes for the hierarchical entity.

In some embodiments, the entity invalidation status for a hierarchical entity indicates whether the hierarchical entity is deemed valid at a time associated with performing monitoring of the hierarchical database (e.g., at current a monitoring iteration during which a current database monitoring data object is generated). In some embodiments, the invalidation iteration identifier for the hierarchical entity indicates a monitoring iteration during which the hierarchical entity is first designated as being invalid. In some embodiments, the creation iteration identifier for the hierarchical entity indicates a monitoring iteration during which the hierarchical entity is first created. In some embodiments, an entity attribute for the hierarchical entity indicates data defining the hierarchical entity. In some embodiments, the entity tracking data object for a hierarchical entity further indicates one or more hierarchical relationships of the hierarchical entity with other hierarchical entities associated with the hierarchical database.

An operational example of entity tracking data objects 601-606 for six hierarchical entities is depicted in the entity tracking data object file 600 of FIG. 6. As depicted in the entity tracking data object file 600 of FIG. 6, the entity tracking data objects 601-605 are each associated with a group of attributes. For example, the entity tracking data object 601 which corresponds to a "Member Group Contract Plan Option" hierarchical entity type in the hierarchical database data model 500 of FIG. 5 is associated with various associated entity attributes such as customerPurchaseIdentifier and customerPurchaseEffectiveDate. As another example, the entity tracking data object 602 which corresponds to a "Benefit Plan" hierarchical entity type in the hierarchical database data model 500 of FIG. 5 is associated with various associated entity attributes such as productIdentifier and productTypeCode. As a yet another example, the entity tracking data object 603 which corresponds to a "Membership" hierarchical entity type in the hierarchical database data model 500 of FIG. 5 is associated with various associated entity attributes such as medicareEntitlementTypeCode and subscriberResidentStateCode. As a further example, the entity tracking data objects 604-606 which correspond to "Subscriber Count," "Member Count," and "Surviving Spouse Count" hierarchical entity types respectively in the hierarchical database data model 500 of FIG. 5 are each associated with a count entity attribute.

At step/operation 403, the hierarchical database computing entity 106 updates the plurality of entity tracking data objects for the hierarchical entities associated with the hierarchical database by analyzing entity-related data associated with each hierarchical entity of the hierarchical entities associated with the hierarchical database. In some embodiments, the hierarchical database computing entity 106 determines whether any of the entity tracking data objects in the plurality of entity tracking data objects for the hierarchical entities associated with the hierarchical database should be modified (e.g., set to an invalid entity status) and/or whether any new entity tracking data objects should be added to the plurality of entity tracking data objects for the hierarchical entities associated with the hierarchical database. In some embodiments, the hierarchical database computing entity 106 performs the noted determination based at least in part on entity-related data stored with respect to the hierarchical entities in the hierarchical database. For example, the hierarchical database computing entity 106 may determine that the invalidation status for a member entity type should be set to indicate an invalid entity status responsive to determining that the member has left a particular member group contract plan option.

In some embodiments, subsequent to determining that any of the entity tracking data objects in the plurality of entity tracking data objects associated with the hierarchical database should be modified and/or whether any new entity tracking data objects should be added to the plurality of entity tracking data objects associated with the hierarchical database, the hierarchical database computing entity 106 updates the plurality of entity tracking data objects associated with the hierarchical database in accordance with the noted preceding determinations. In some embodiments, updating the plurality of entity tracking data objects comprises analyzing each of the plurality of hierarchical entities starting from a highest hierarchical level to a lowest hierarchical level.

In some embodiments, step/operation 403 may be performed in relation to a particular hierarchical entity in accordance with the various steps/operations depicted in FIG. 7. The process depicted in FIG. 7 begins at step/operation 701 when the hierarchical database computing entity 106 determines an entity invalidation condition for the corresponding hierarchical entity. The entity invalidation condition for the corresponding hierarchical entity indicates whether the entity tracking data object for the hierarchical entity should be set to indicate an invalid status. In some embodiments, the plurality of hierarchical entities for the hierarchical database are associated with a current monitoring iteration of a plurality of monitoring iterations, the plurality of monitoring iterations is associated with a temporal order which defines a precedent monitoring iteration for the current monitoring iteration, and the invalidation condition for each hierarchical entity of the plurality of hierarchical entities is determined based at least in part on whether the entity-related data indicate one or more entity condition updates for the hierarchical entity between the precedent monitoring iteration and the current monitoring iteration.

In some embodiments, the hierarchical database computing entity 106 determines the invalidation condition for the corresponding hierarchical entity based at least in part on entity-related data associated with the corresponding hierarchical entity and maintained in the hierarchical database. For example, the entity-related data associated with the hierarchical entity may indicate occurrence of at least one of an invalidating event (e.g., a cancellation event) or an attribute modification event (e.g., a plan adjustment event) with respect to the corresponding hierarchical entity which in turn may trigger setting the entity invalidation condition for the corresponding hierarchical entity accordingly.

At step/operation 702, the hierarchical database computing entity 106 determines whether the entity invalidation condition for the corresponding hierarchical entity indicates an invalid entity condition, a modified entity condition, or a valid entity condition. In some embodiments, the entity invalidation condition for the corresponding hierarchical entity may indicate an invalid entity condition, a modified entity condition, or a valid entity condition. The noted invalidation conditions are described in greater detail below with reference to steps/operations 703-705.

At step/operation 703, responsive to determining that the entity invalidation condition for the corresponding hierarchical entity indicates an invalid entity condition, the hierarchical database computing entity 106 performs a non-replicating invalidation of the corresponding hierarchical entity, wherein performing the non-replicating invalidation of the corresponding hierarchical entity may include updating each entity tracking data object for a related hierarchical entity of the one or more related hierarchical entities associated with the corresponding hierarchical entity to invalidate the related hierarchical entity. In some embodiments, the entity tracking data object for a hierarchical entity of the plurality of hierarchical entities comprises an invalidation iteration identifier for the hierarchical entity. In some embodiments, performing the non-replicating invalidation of a hierarchical entity of the plurality of hierarchical entities comprises modifying the invalidation iteration identifier for the hierarchical entity to indicate a current monitoring iteration.

In some embodiments, an invalid entity condition indicates that the hierarchical entity has been nullified and/or cancelled. For example, the invalid entity condition for a hierarchical entity having a member entity type may indicate that a member has deceased and/or has left a group plan. In some embodiments, to accommodate the invalid invalidation condition for a hierarchical entity, the hierarchical database computing entity 106 invalidates the entity tracking data object for both the invalidated hierarchical entity and any hierarchical entities that depend from the hierarchical entity without replacing any of the noted invalidated hierarchical entities. In some embodiments, to invalidate an entity tracking data object, the hierarchical database computing entity 106 sets the invalidation status of the entity tracking data object to indicate an invalidation status and/or sets an invalidation iteration identifier of the entity tracking data object to indicate a current monitoring iteration.

At step/operation 704, responsive to determining that the entity invalidation condition for the corresponding hierarchical entity indicates a modified entity condition, the hierarchical database computing entity 106 performs a replicating invalidation of the corresponding hierarchical entity, wherein performing the replicating invalidation of the corresponding hierarchical entity may include updating each entity tracking data object for a related hierarchical entity of the one or more related hierarchical entities associated with the corresponding hierarchical entity to invalidate the related hierarchical entity, generating a modified entity tracking data object for the corresponding hierarchical entity, and generating a replicated tracking data object for each related hierarchical entity of the one or more related hierarchical entities associated with the corresponding hierarchical entity other than the corresponding hierarchical entity.

In some embodiments, a modified entity condition indicates that at least one entity attribute associated with the entity has been modified and/or changed. For example, the modified entity condition for a member entity type may indicate that a member has changed her deductible range selection. In some embodiments, to accommodate the modified invalidation condition for a hierarchical entity, the hierarchical database computing entity 106 invalidates the entity tracking data object for both the invalidated hierarchical entity and any hierarchical entities that depend from the hierarchical entity but generates new entity tracking data objects to replace the invalidated entity tracking data objects, where the new tracking data object for the corresponding hierarchical entity has modified attributes.

In some embodiments, to invalidate an entity tracking data object, the hierarchical database computing entity 106 sets the invalidation status of the entity tracking data object to indicate an invalidation status. In some embodiments, to invalidate an entity tracking data object, the hierarchical database computing entity 106 sets an invalidation iteration identifier of the entity tracking data object to indicate a current monitoring iteration. In some embodiments, to generate a new entity tracking data object, the hierarchical database computing entity 106 generates data associated with the new entity tracking data object (e.g., in accordance with one or more attribute modification requests associated with the modified entity condition) and/or sets a creation iteration identifier of the entity tracking data object to indicate a current monitoring iteration.

In some embodiments, the entity tracking data object for a hierarchical entity of the plurality of hierarchical entities comprises one or more entity attributes for the hierarchical entity. In some of those embodiments, generating the modified entity tracking data object for a hierarchical entity of the plurality of hierarchical entities comprises generating an entity tracking data object based at least in part on the hierarchical entity and one or more modifications to the one or more entity attributes for the hierarchical entity in accordance with the modified entity condition. In some embodiments, the entity tracking data object for a hierarchical entity of the plurality of hierarchical entities comprises a creation iteration identifier for the hierarchical entity. In some of those embodiments, performing the replicating invalidation of a hierarchical entity of the plurality of hierarchical entities comprises generating the modified entity tracking data object for the hierarchical entity to indicate a current monitoring iteration in the creation iteration identifier for the hierarchical entity.

At step/operation 705, responsive to determining that the entity invalidation condition for the corresponding hierarchical entity indicates a valid entity condition, the hierarchical database computing entity 106 does not invalidate the entity tracking data object associated with the hierarchical entity. In some embodiments, a valid entity condition indicates that neither the hierarchical entity has been nullified and/or cancelled nor at least one entity attribute associated with the entity has been modified and/or changed. Accordingly, responsive to determining that the entity invalidation condition for the corresponding hierarchical entity indicates a valid entity condition as defined herein, the hierarchical database computing entity 106 does not need to perform any invalidations of entity tracking data objects or any generation of new entity tracking data objects.

Returning to FIG. 4, at step/operation 404, the hierarchical database computing entity 106 generates a database monitoring data object based at least in part on the plurality of entity tracking data objects. In some embodiments, subsequent to updating the plurality of entity tracking data objects associated with the hierarchical database, the hierarchical database computing entity 106 utilizes the updated plurality of entity tracking data objects to generate the database monitoring data object, which may be a database object that includes each of the updated plurality of entity tracking data objects. In some embodiments, the database monitoring data object may be a latest iteration of a monitoring report associated with the hierarchical database that can be compared with prior and subsequent monitoring reports associated with the hierarchical database.

At step/operation 405, the hierarchical database computing entity 106 performs monitoring of the hierarchical database based at least in part on the database monitoring data object. In some embodiments, performing monitoring of the hierarchical database based at least in part on the database monitoring data object includes setting one or more database configuration parameters for the hierarchical database based at least in part on the database monitoring data object (e.g., based at least in part on comparing the database monitoring data object and other database monitoring data objects associated with other monitoring iterations). In some embodiments, performing monitoring of the hierarchical database based at least in part on the database monitoring data object includes performing one or more load balancing operations for the hierarchical database based at least in part on the database monitoring data object (e.g., based at least in part on comparing the database monitoring data object and other database monitoring data objects associated with other monitoring iterations).

In some embodiments, performing monitoring of the hierarchical database based at least in part on the database monitoring data object includes generating a monitoring report for the hierarchical database based at least in part on the database monitoring data object and transmitting the monitoring report to a monitoring authority computing device (e.g., a financial institution server). In some embodiments, performing monitoring of the hierarchical database based at least in part on the database monitoring data object includes generating a maintenance recommendation for the hierarchical database based at least in part on the database monitoring data object and transmitting the maintenance recommendation a monitoring authority computing device (e.g., a financial institution server).

B. Generating Entity Tracking Reports

FIG. 8 is a flowchart diagram of an example process 800 for generating an entity tracking report for a hierarchical database during a current monitoring iteration. Via the various steps/operations of process 800, the hierarchical database computing entity 106 can generate entity tracking reports for various hierarchical entities in a hierarchical in an effective and efficient manner.

The process 800 begins at step/operation 801 when the hierarchical database computing entity 106 creates a new reporting iteration. At step/operation 802, the hierarchical database computing entity 106 retrieves a list of hierarchical entities. At step/operation 803, for each new hierarchical entity, the hierarchical database computing entity 106 generates a new entity tracking data object for the new hierarchical entity, where the new entity tracking data object includes a creation iteration identifier that indicates the current monitoring iteration. At step/operation 804, for each hierarchical entity whose invalidation condition indicates a need for invalidating the entity, the hierarchical database computing entity 106 invalidates the corresponding hierarchical entity and all its dependent hierarchical entities. At step/operation 805, for each hierarchical entity whose invalidation condition does not indicate a need for invalidating the entity but whose condition indicates a need for adding new dependent hierarchical entities for the corresponding hierarchical entity, the hierarchical database computing entity 106 adds new entity tracking data objects for the new dependent hierarchical entities for the corresponding hierarchical entity.

FIG. 9 is a flowchart diagram of an example process 900 for generating a membership accounting report for a membership information database. Via the various steps/operations of process 900, the hierarchical database computing entity 106 can perform membership accounting in an effective and efficient manner. While various embodiments of the process 900 are described with reference to a health insurance member insurance information database, a person of ordinary skill in the art will recognize that the disclosed techniques can be utilized for any membership insurance database storing data associated with other membership contexts. In some embodiments, the hierarchical database computing entity 106 repeats the steps/operations 902-905 described below for each temporal unit associated with a current monitoring iteration (e.g., each month for a period of 48 months prior to a time associated with the current monitoring iteration).

The process 900 begins at step/operation 901 when the hierarchical database computing entity 106 creates a new monitoring report iteration identified by a unique identifier R. In some embodiments, the hierarchical database computing entity 106 then retrieves a list of member group contract plan options for the current month M that have not previous been reported. At step/operation 902, for each new member group contract plan option valid for M, the hierarchical database computing entity 106 adds the member group contract plan option as a child of the current iteration of the report. In some embodiments, the hierarchical database computing entity 106 sets iteration identifier for each child is set to R.

In some embodiments, the hierarchical database computing entity 106 then retrieves a list of member group contract plan options previously reported for M. At step/operation 903, for each previously reported plan option, if any of the attributes of the member group contract plan option have changed, or if the member group contract plan option is no longer valid, the hierarchical database computing entity 106 invalidates the member group contract plan option, setting the invalidation iteration identifier to R. The purpose of this invalidation identifier may to create the audit trail between each report iteration's plan option instance, forming a chain between instances of a given plan option. This will invalidate all associated benefit plan and membership child records, traversing according to the process flow. The membership counts associated to the membership are reversed with −1 counts for the previously reported +1 counts. In some embodiments, if the invalidation was due to an attribute change, the hierarchical database computing entity 106 generates new member group contract plan option structure, storing the iteration identifier R as the iteration in which the plan option instance was created.

At step/operation 904, if a plan option was not invalidated due to becoming invalid or an attribute change, the hierarchical database computing entity 106 traverses structure to the benefit plan level for each benefit plan previously reported under the plan option. In some embodiments, for each benefit plan, if any of the attributes of the benefit plan have changed, or if the benefit plan is no longer valid, the hierarchical database computing entity 106 invalidates the benefit plan, setting the invalidation iteration identifier to R. The purpose of this invalidation identifier is to create the audit trail between each report iteration's benefit plan instance, forming a chain between instances of a given plan option. This will invalidate all associated membership child records, traversing according to the process flow. The membership counts associated to the membership are reversed with −1 counts for the previously reported +1 counts. Please note the plan option for the previously reported iteration maintains validity. In some embodiments, if the invalidation was due to an attribute change, the hierarchical database computing entity 106 generates a new member benefit plan structure, storing the iteration identifier R as the iteration in which the benefit plan instance was created.

At step/operation 905, if the plan option was not invalidated due to becoming invalid or an attribute change, the hierarchical database computing entity 106 traverses the structure to the membership level for each member previously reported under the plan option. In some embodiments, for each member, if any of the attributes of the member have changed, or if the member is no longer valid, the hierarchical database computing entity 106 invalidates the member, setting the invalidation iteration identifier to R. The purpose of this invalidation identifier is to create the audit trail between each report iteration's member instance, forming a chain between instances of a member. The membership counts associated to the member are reversed with −1 counts for the previously reported +1 counts. Please note that the plan option for the previously reported iteration maintains validity, as does the previously reported benefit plan, maintaining those chains, while attaching the new member. In some embodiments, if the invalidation was due to an attribute change, the hierarchical database computing entity 106 generates a new member, storing the iteration identifier R as the iteration in which the member instance was created.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented for generating a database monitoring data object for a hierarchical database comprising entity-related data associated with a plurality of hierarchical entities, the computer-implemented method comprising:

for each hierarchical entity of the plurality of hierarchical entities, identifying one or more related hierarchical entities of the plurality of hierarchical entities, wherein the one or more related hierarchical entities comprise the corresponding hierarchical entity and any hierarchical entities of the plurality of hierarchical entities that depend from the corresponding hierarchical entity;

for each hierarchical entity of the plurality of hierarchical entities, identifying an entity tracking data object of a plurality of entity tracking data objects, wherein the entity tracking data object comprises an entity invalidation status for the corresponding hierarchical entity;

for each hierarchical entity of the plurality of hierarchical entities whose entity invalidation status indicates a valid entity status, updating the plurality of entity tracking data objects by:

(a) determining, based at least in part on the entity-related data, an entity invalidation condition associated with the corresponding hierarchical entity, (b) determining whether the entity invalidation condition associated with the corresponding hierarchical entity indicates an invalid entity condition or a modified entity condition, (c) responsive to determining that the entity invalidation condition associated with the corresponding hierarchical entity indicates the invalid entity condition, performing a non-replicating invalidation of the corresponding hierarchical entity, wherein performing the non-replicating invalidation of the corresponding hierarchical entity comprises updating each entity tracking data object for a related hierarchical entity of the one or more related hierarchical entities associated with the corresponding hierarchical entity to invalidate the related hierarchical entity, and (d) responsive to determining that the entity invalidation condition associated with the corresponding hierarchical entity indicates the modified entity condition, performing a replicating invalidation of the corresponding hierarchical entity, wherein performing the replicating invalidation of the corresponding hierarchical entity comprises updating each entity tracking data object for a related hierarchical entity of the one or more related hierarchical entities associated with the corresponding hierarchical entity to invalidate the related hierarchical entity, generating a modified entity tracking data object for the corresponding hierarchical entity, and generating a replicated tracking data object for each related hierarchical entity of the one or more related hierarchical entities associated with the corresponding hierarchical entity other than the corresponding hierarchical entity; and subsequent to updating the plurality of entity tracking data objects:
(a) generating the database monitoring data object based at least in part on the plurality of entity tracking data objects, and
(b) performing monitoring of the hierarchical database based at least in part on the database monitoring data object.

2. The computer-implemented method of claim 1, wherein:
the entity tracking data object for a hierarchical entity of the plurality of hierarchical entities comprises one or more entity attributes for the hierarchical entity, and
generating the modified entity tracking data object for a hierarchical entity of the plurality of hierarchical entities comprises generating an entity tracking data object based at least in part on the hierarchical entity and one or more modifications to the one or more entity attributes for the hierarchical entity in accordance with the modified entity condition.

3. The computer-implemented method of claim 1, wherein:
the entity tracking data object for a hierarchical entity of the plurality of hierarchical entities comprises an invalidation iteration identifier for the hierarchical entity, and
performing the non-replicating invalidation of a hierarchical entity of the plurality of hierarchical entities comprises modifying the invalidation iteration identifier for the hierarchical entity to indicate a current monitoring iteration.

4. The computer-implemented method of claim 1, wherein:
the entity tracking data object for a hierarchical entity of the plurality of hierarchical entities comprises a creation iteration identifier for the hierarchical entity, and
performing the replicating invalidation of a hierarchical entity of the plurality of hierarchical entities comprises generating the modified entity tracking data object for the hierarchical entity to indicate a current monitoring iteration in the creation iteration identifier for the hierarchical entity.

5. The computer-implemented method of claim 1, wherein updating the plurality of entity tracking data objects comprises analyzing each of the plurality of hierarchical entities starting from a highest hierarchical level to a lowest hierarchical level.

6. The computer-implemented method of claim 1, wherein each hierarchical entity of the plurality of hierarchical entities is associated with an entity designation of a plurality of entity designations and a temporal unit designation of a plurality of temporal unit designations.

7. The computer-implemented method of claim 1, wherein:
the plurality of hierarchical entities is associated with a current monitoring iteration of a plurality of monitoring iterations,
the plurality of monitoring iterations is associated with a temporal order which defines a precedent monitoring iteration for the current monitoring iteration, and
the invalidation condition for each hierarchical entity of the plurality of hierarchical entities is determined based at least in part on whether the entity-related data indicate one or more entity condition updates for the hierarchical entity between the precedent monitoring iteration and the current monitoring iteration.

8. The computer-implemented method of claim 1, wherein performing monitoring of the hierarchical database based at least in part on the database monitoring data object comprises setting one or more database configuration parameters for the hierarchical database based at least in part on the database monitoring data object.

9. The computer-implemented method of claim 1, wherein performing monitoring of the hierarchical database based at least in part on the database monitoring data object comprises:
generating a monitoring report for the hierarchical database based at least in part on the database monitoring data object; and
transmitting the monitoring report to a monitoring authority computing device.

10. The computer-implemented method of claim 1, wherein:
the hierarchical database is a membership information database, and
at least some of plurality of hierarchical entities are associated with one or more member profiles associated with the membership information database.

11. An apparatus for generating a database monitoring data object for a hierarchical database comprising entity-related data associated with a plurality of hierarchical entities, the apparatus comprising at least one processor and at least one memory including program code, the at least one memory and the program code configured to, with the processor, cause the apparatus to at least:
for each hierarchical entity of the plurality of hierarchical entities, identify one or more related hierarchical entities of the plurality of hierarchical entities, wherein the one or more related hierarchical entities comprise the corresponding hierarchical entity and any hierarchical entities of the plurality of hierarchical entities that depend from the corresponding hierarchical entity;
for each hierarchical entity of the plurality of hierarchical entities, identify an entity tracking data object of a plurality of entity tracking data objects, wherein the entity tracking data object comprises an entity invalidation status for the corresponding hierarchical entity;
for each hierarchical entity of the plurality of hierarchical entities whose entity invalidation status indicates a valid entity status, update the plurality of entity tracking data objects by:

(a) determining, based at least in part on the entity-related data, an entity invalidation condition associated with the corresponding hierarchical entity,
(b) determining whether the entity invalidation condition associated with the corresponding hierarchical entity indicates an invalid entity condition or a modified entity condition,
(c) responsive to determining that the entity invalidation condition associated with the corresponding hierarchical entity indicates the invalid entity condition, performing a non-replicating invalidation of the corresponding hierarchical entity, wherein performing the non-replicating invalidation of the corresponding hierarchical entity comprises updating each entity tracking data object for a related hierarchical entity of the one or more related hierarchical entities associated with the corresponding hierarchical entity to invalidate the related hierarchical entity, and
(d) responsive to determining that the entity invalidation condition associated with the corresponding hierarchical entity indicates the modified entity condition, performing a replicating invalidation of the corresponding hierarchical entity, wherein performing the replicating invalidation of the corresponding hierarchical entity comprises updating each entity tracking data object for a related hierarchical entity of the one or more related hierarchical entities associated with the corresponding hierarchical entity to invalidate the related hierarchical entity, generating a modified entity tracking data object for the corresponding hierarchical entity, and generating a replicated tracking data object for each related hierarchical entity of the one or more related hierarchical entities associated with the corresponding hierarchical entity other than the corresponding hierarchical entity; and subsequent to updating the plurality of entity tracking data objects:
(a) generate the database monitoring data object based at least in part on the plurality of entity tracking data objects, and
(b) perform monitoring of the hierarchical database based at least in part on the database monitoring data object.

12. The apparatus of claim 11, wherein:
the entity tracking data object for a hierarchical entity of the plurality of hierarchical entities comprises one or more entity attributes for the hierarchical entity, and
generating the modified entity tracking data object for a hierarchical entity of the plurality of hierarchical entities comprises generating an entity tracking data object based at least in part on the hierarchical entity and one or more modifications to the one or more entity attributes for the hierarchical entity in accordance with the modified entity condition.

13. The apparatus of claim 11, wherein:
the entity tracking data object for a hierarchical entity of the plurality of hierarchical entities comprises an invalidation iteration identifier for the hierarchical entity, and
performing the non-replicating invalidation of a hierarchical entity of the plurality of hierarchical entities comprises modifying the invalidation iteration identifier for the hierarchical entity to indicate a current monitoring iteration.

14. The apparatus of claim 11, wherein:
the entity tracking data object for a hierarchical entity of the plurality of hierarchical entities comprises a creation iteration identifier for the hierarchical entity, and
performing the replicating invalidation of a hierarchical entity of the plurality of hierarchical entities comprises generating the modified entity tracking data object for the hierarchical entity to indicate a current monitoring iteration in the creation iteration identifier for the hierarchical entity.

15. The apparatus of claim 11, wherein updating the plurality of entity tracking data objects comprises analyzing each of the plurality of hierarchical entities starting from a highest hierarchical level to a lowest hierarchical level.

16. The apparatus of claim 11, wherein each hierarchical entity of the plurality of hierarchical entities is associated with an entity designation of a plurality of entity designations and a temporal unit designation of a plurality of temporal unit designations.

17. The apparatus of claim 11, wherein:
the plurality of hierarchical entities is associated with a current monitoring iteration of a plurality of monitoring iterations,
the plurality of monitoring iterations is associated with a temporal order which defines a precedent monitoring iteration for the current monitoring iteration, and
the invalidation condition for each hierarchical entity of the plurality of hierarchical entities is determined based at least in part on whether the entity-related data indicate one or more entity condition updates for the hierarchical entity between the precedent monitoring iteration and the current monitoring iteration.

18. The apparatus of claim 11, wherein performing monitoring of the hierarchical database based at least in part on the database monitoring data object comprises setting one or more database configuration parameters for the hierarchical database based at least in part on the database monitoring data object.

19. The apparatus of claim 11, wherein performing monitoring of the hierarchical database based at least in part on the database monitoring data object comprises:
generating a monitoring report for the hierarchical database based at least in part on the database monitoring data object; and
transmitting the monitoring report to a monitoring authority computing device.

20. A computer program product for generating a database monitoring data object for a hierarchical database comprising entity-related data associated with a plurality of hierarchical entities, the computer program product comprising at least one non-transitory computer-readable storage medium having computer-readable program code portions stored therein, the computer-readable program code portions configured to:
for each hierarchical entity of the plurality of hierarchical entities, identify one or more related hierarchical entities of the plurality of hierarchical entities, wherein the one or more related hierarchical entities comprise the corresponding hierarchical entity and any hierarchical entities of the plurality of hierarchical entities that depend from the corresponding hierarchical entity;
for each hierarchical entity of the plurality of hierarchical entities, identify an entity tracking data object of a plurality of entity tracking data objects, wherein the entity tracking data object comprises an entity invalidation status for the corresponding hierarchical entity;

for each hierarchical entity of the plurality of hierarchical entities whose entity invalidation status indicates a valid entity status, update the plurality of entity tracking data objects by:
- (a) determining, based at least in part on the entity-related data, an entity invalidation condition associated with the corresponding hierarchical entity,
- (b) determining whether the entity invalidation condition associated with the corresponding hierarchical entity indicates an invalid entity condition or a modified entity condition,
- (c) responsive to determining that the entity invalidation condition associated with the corresponding hierarchical entity indicates the invalid entity condition, performing a non-replicating invalidation of the corresponding hierarchical entity, wherein performing the non-replicating invalidation of the corresponding hierarchical entity comprises updating each entity tracking data object for a related hierarchical entity of the one or more related hierarchical entities associated with the corresponding hierarchical entity to invalidate the related hierarchical entity, and
- (d) responsive to determining that the entity invalidation condition associated with the corresponding hierarchical entity indicates the modified entity condition, performing a replicating invalidation of the corresponding hierarchical entity, wherein performing the replicating invalidation of the corresponding hierarchical entity comprises updating each entity tracking data object for a related hierarchical entity of the one or more related hierarchical entities associated with the corresponding hierarchical entity to invalidate the related hierarchical entity, generating a modified entity tracking data object for the corresponding hierarchical entity, and generating a replicated tracking data object for each related hierarchical entity of the one or more related hierarchical entities associated with the corresponding hierarchical entity other than the corresponding hierarchical entity; and subsequent to updating the plurality of entity tracking data objects:
- (a) generate the database monitoring data object based at least in part on the plurality of entity tracking data objects, and
- (b) perform monitoring of the hierarchical database based at least in part on the database monitoring data object.

* * * * *